(12) United States Patent
Helot

(10) Patent No.: US 6,407,914 B1
(45) Date of Patent: Jun. 18, 2002

(54) DOCKING SYSTEM FOR PORTABLE COMPUTER

(75) Inventor: Jacques H Helot, Rotterdam (NL)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/547,115

(22) Filed: Apr. 11, 2000

(51) Int. Cl.$^7$ .................................................. G06F 1/16
(52) U.S. Cl. ...................... 361/686; 361/683; 439/638; 710/303; 713/322
(58) Field of Search .................. 361/686, 683, 361/684, 685, 724–727; 439/638, 639; 710/69, 303, 304; 713/322

(56) References Cited

U.S. PATENT DOCUMENTS

| | | | | |
|---|---|---|---|---|
| 5,187,645 A | * | 2/1993 | Spalding et al. | 361/686 |
| 5,192,226 A | * | 3/1993 | Wang | 439/639 |
| 5,436,792 A | * | 7/1995 | Leman et al. | 361/686 |
| 5,459,637 A | * | 10/1995 | Ma et al. | 361/686 |
| 5,461,546 A | * | 10/1995 | Kobayashi et al. | 361/686 |
| 5,931,929 A | * | 8/1999 | Tran et al. | 710/69 |
| 6,046,571 A | * | 4/2000 | Bovio et al. | 361/686 |
| 6,185,096 B1 | * | 2/2001 | Helot et al. | 361/686 |
| 6,246,578 B1 | * | 6/2001 | Wei et al. | 361/686 |
| 6,297,963 B1 | * | 10/2001 | Fogle | 361/686 |

* cited by examiner

*Primary Examiner*—Darren Schuberg
*Assistant Examiner*—Lisa Lea-Edmonds

(57) ABSTRACT

The present invention of a docking system is embodied in a portable computer receiving tray and interface cable having the capability to connect a large variety of portable computers, such as, for example, laptops, notebooks, palmtops or handheld computers, to a remote expansion and upgrade box, such as a cable dock. The interface cable can be used with or without the receiving tray, and as such, it can connect directly to the receiving tray, or to the portable computer on one end, and to the cable dock on the other end. Further, both the receiving tray and the interface cable may have at least one integrated auxiliary connector for directly connecting peripherals. In addition, the receiving tray may have at least one internal computer peripheral expansion bay either integrated into the tray, or provided via a removable tray expansion module.

20 Claims, 4 Drawing Sheets

DOCKING SYSTEM FOR PORTABLE COMPUTER

FIELD OF THE INVENTION

This invention relates to a docking system apparatus for receiving a computer and connecting the computer to remote electronics through an electrical interface cable.

BACKGROUND

Docking systems have been used to interface portable computers such as laptop, notebook, palmtop, and handheld computers to electronic peripherals such as computer monitors, optical disk drives, full-size keyboards, pointing devices such as trackballs or mice, digital cameras, and other devices. Many types and styles of docking systems, such as, for example, port replicators, enhanced port replicators, mini-docks, full docking stations, and cable docks, have been developed to interface with portable computers.

These docking systems have several common features, and consequently several common limitations. For example, port replicators are limited to the connectors built into them, such as, for example, PS2 keyboard and mouse connectors, serial connectors, parallel connectors, Universal Serial Bus (USB) connectors, audio input and output connectors, and video connectors, and thus have no expansion capability. If a computer user desires to add a peripheral such as an Ethernet connection to a computer network, or a faster graphics processor, the user would be unable to add such capability through the port replicator. Further, port replicators typically connect directly to the back of a portable computer, while multiple peripherals are connected via interface cables directly to the back of the port replicator. Consequently, the surface upon which the computer is resting often appears cluttered and unsightly due to a tangle of interface cables connected to the port replicator.

Similarly, enhanced port replicators, mini-docks, and full docking stations have the same problem as the port replicator described above in that the surface upon which the computer and enhanced port replicator is resting may have an unsightly and cluttered appearance due to multiple cables attached to the back of the enhanced port replicator. In addition, because enhanced port replicators, mini-docks, and full docking stations do have some expansion capability, they are larger and bulkier than the port replicator, thus compounding the problem of clutter.

"Cable docks" attempt to address the problems of providing the ability for the user to expand or upgrade the capabilities of the portable computer, while eliminating the unsightly tangle of cables cluttering the users work surface by providing an interface cable that connects on one end to a portable computer, and on the other end to a remote case or "cable dock" that provides expansion and upgrade capabilities similar to that of the full docking station. However, while the cable dock can be placed remotely from the users workspace, a user often has the need to frequently connect and disconnect peripheral devices such as keyboards and mice to and from the cable dock when connecting or disconnecting the portable computer to or from the cable dock. Keyboards and mice have relatively short cables. Consequently, because these devices are preferably very close to the user, the cable dock must also be relatively close to the user when the user connects such devices to the cable dock. Consequently, the cable dock often ends up back on the user's work surface or desk, with a clutter of cables connected to the back of the cable dock.

Therefore, what is needed is an apparatus for connecting a portable computer to multiple peripherals that not only eliminates the problem of cluttering the user's workspace with a tangle of cables and a bulky docking system, but also allows quick and easy connection and disconnection of peripheral devices, such as a mouse, trackball, or full size keyboard that the user keeps with the portable computer.

SUMMARY

The present invention of a docking system is embodied in a portable computer receiving tray and interface cable having the capability to connect a large variety of portable computers, such as, for example, laptops, notebooks, palmtops or handheld computers, to a remote expansion and upgrade box, such as a cable dock. The interface cable can be used with or without the receiving tray, and as such, it can connect directly to the receiving tray, or to the portable computer on one end, and to the cable dock on the other end. Further, both the receiving tray and the interface cable may have at least one integrated auxiliary connector for directly connecting peripherals. In addition, the receiving tray may have at least one internal computer peripheral expansion bay either integrated into the tray, or provided via a removable tray expansion module.

BRIEF DESCRIPTION OF THE DRAWINGS

Referring now to the drawings in which like reference numbers represent corresponding parts throughout.

DETAILED DESCRIPTION

Figure 1:
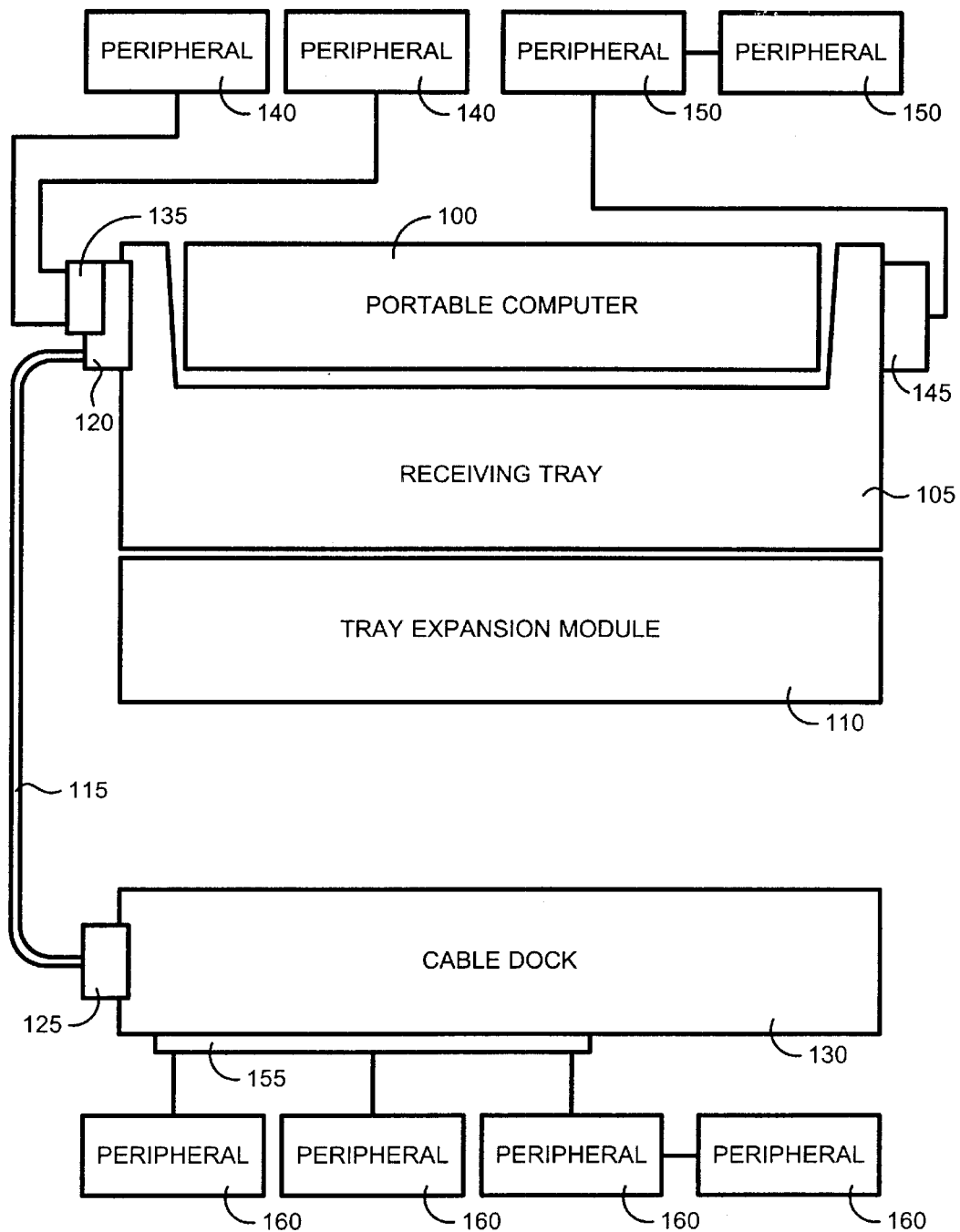
FIG. 1 is a general functional block diagram of a docking system illustrating an overview of the present invention.

In the following description of the invention, reference is made to the accompanying drawings, which form a part hereof, and in which is shown by way of illustration a specific example in which the invention may be practiced. It is to be understood that other embodiments may be utilized and structural changes may be made without departing from the scope of the present invention.

Introduction

The present invention of a docking system is embodied in a receiving tray and interface cable for connecting a portable computer, such as, for example, a laptop, notebook, palmtop or handheld computer, to a remote expansion/upgrade box, such as a cable dock, for interfacing peripheral devices to the portable computer while allowing peripheral devices which are frequently connected and disconnected to be connected directly to at least one auxiliary peripheral connector on either the interface cable or the receiving tray.

The receiving tray and interface cable of the present invention have the capability to interface with a large variety -of portable computers. Specifically, a receiving tray having an internal electrical connector for interfacing with a portable computer is designed to establish an electrical connection with the portable computer by simply sliding the portable computer into the receiving tray. The receiving tray has an external electrical connector for establishing an electrical connection to a tray connector on one end of the interface cable. The other end of the interface cable connects to a cable dock to establish an electrical connection between the portable computer and the cable dock.

Alternatively, the interface cable may be connected directly to a portable computer, thereby bypassing the receiving tray. As with the previous embodiment, a dock connector on the other end of the interface cable connects the portable computer to the cable dock.

The receiving tray has security latches that are designed to receive specific portable computers. The security latches serve at least two purposes. First, the security latches prevent a portable computer from being removed from the receiving tray until such time as it is safe to do so (as determined by the operating system or other device), and second, the security latches prevent or deter theft of the portable computer. These security latches work in combination with a release button or lever integrated into the surface of the receiving tray and associated control electronics and software. Further, in an alternate embodiment, the length of the receiving tray is increased to allow easier insertion of a portable computer when the receiving tray is placed beneath a computer display stand.

Alternately the receiving tray may be designed without security latches and the associated control electronics and software. This embodiment is valuable for use with portable computers that have not been designed to interface with security latches, or where the user does not require or desire the aforementioned security features.

Another embodiment of the receiving tray has an expansion module having at least one expansion bay for the addition of peripheral devices. In one embodiment, the expansion module is detachable from the receiving tray. In a further embodiment, the portable computer may connect directly to the expansion module, which in turn may be connected to the receiving tray. In this embodiment, the portable computer controls peripheral devices installed into the expansion module unless the expansion module is connected to the receiving tray. When the expansion module is connected to the receiving tray, peripheral devices installed in the expansion bays are controlled by the electronics in the remote cable dock through the interface cable that connects the receiving tray to the cable dock.

In each of the aforementioned embodiments of interface cable, the tray connector of the interface cable has at least one auxiliary connector, disposed on the surface of the tray connector for allowing the connection of at least one peripheral device. As with other peripheral devices connected to the portable computer through the receiving tray, control of the devices is managed remotely by the electronics in the cable dock via the interface cable. Alternately, the peripherals may be controlled directly by the portable computer.

Similarly, in another embodiment of the receiving tray, the auxiliary connectors may be integrated directly into the surface of the receiving tray. Consequently, the user may connect peripheral devices directly to the receiving tray when the user desires either to place the peripherals near the portable computer, or when it is convenient for the user to use the local auxiliary connectors instead of the remote connectors on the cable dock. Again, as with other peripheral devices connected to the portable computer through the either the interface cable or the cable dock, control of the peripheral devices is managed remotely by the electronics of the cable dock. Alternately, the peripherals may be controlled directly by the portable computer.

General Component Overview

FIG. 1 is a general functional block diagram of a docking system illustrating an apparatus for interfacing a portable computer to a remote expansion/upgrade box, such as a cable dock, for interfacing peripheral devices to the portable computer while allowing multiple peripheral devices to be connected directly to at least one auxiliary connector integrated within either the interface cable or the receiving tray.

Specifically, a portable computer 100 is removably attached to a receiving tray 105 of the docking system. The connection between the portable computer 100 and the receiving tray 105 preferably provides both a physical and electrical connection that both secures the portable computer to the receiving tray, and provides an electrical communications interface between the portable computer and the receiving tray. A tray expansion module 110 for allowing a user to add internal peripheral devices such as, for example, optical disk drives, floppy drives, or tape drives, is removably connected to the receiving tray 105. The tray expansion module 110 is not required for operation of the receiving tray 105. The connection between the receiving tray 105 and the tray expansion module 110 provides both a physical and electrical connection that both secures the tray expansion module to the receiving tray, and provides an electrical communications interface between the portable computer, peripheral devices within the tray expansion module and the receiving tray.

Alternately, the portable computer 100 may connect directly to the tray expansion module 110, with the tray expansion module in turn connecting to the receiving tray 105. As described above, the connections between the portable computer 100, the tray expansion module 110, and the receiving tray 105 provide electrical connections that provide an electrical communications interface between the portable computer, peripheral devices within the tray expansion module and the receiving tray.

An interface cable 115 is removably connected to the receiving tray 105 via a tray connector 120 that establishes an electrical interface between the receiving tray and the interface cable. A dock connector 125 on the other end of the interface cable 115 establishes an electrical connection to a cable dock 130, thereby establishing an electrical communications pathway between the portable computer 100 in the receiving tray 105 and the cable dock via the interface cable.

The tray connector 120 of the interface cable 115 has at least one auxiliary connector 135 for allowing the user to attach peripheral devices 140 such as, for example, a mouse, trackball, keyboard, digital camera, scanner, microphone, speakers, or a video display device. The auxiliary connectors 135 of the tray connector 120 may be of any desired number, combination, or type, such as for example, PS2, USB, serial, parallel, IEEE 1394, audio input or output, or video input or output connectors. These auxiliary connectors 135 provide an electrical communications interface between attached peripheral devices 140 and the portable computer 100 via the interface cable 115 and the cable dock 130. Alternately, the auxiliary connectors 135 may be addressed directly by the portable computer 100, thereby bypassing the cable dock 130 in controlling the peripheral devices 140.

In an alternate embodiment, the receiving tray 105 may also have any desired combination of auxiliary connectors 145, such as, for example, PS2, USB, serial, parallel, IEEE 1394, audio input or output, or video input or output connectors for allowing the user to attach peripheral devices 150 directly or serially to the receiving tray. Similar to the auxiliary connectors 135 on the tray connector 120 of the interface cable 115, the portable computer 100 communicates with peripheral devices 150 attached to the auxiliary connectors 145 of the receiving tray 105 through the cable dock 130 via the interface cable. Alternately, the auxiliary connectors 145 may also be addressed directly by the portable computer 100, thereby bypassing the cable dock 130 in controlling the peripheral devices 150.

The cable dock 130 contains control electronics for interfacing peripheral devices to the portable computer 100 via the interface cable 115. The cable dock 130 communicates with the portable computer 100 via the interface cable 115. Further, as with the auxiliary connector 135 of the tray connector 120 of the interface cable 115, and the auxiliary connector 145 of the receiving tray, the cable dock 130 has auxiliary connectors 155, such as, for example, PS2, USB, serial, parallel, IEEE 1394, audio input or output, or video input or output connectors, for allowing the user to attach peripheral devices 160 directly or serially to the cable dock. As with the auxiliary connectors 135 on the tray connector 120 of the interface cable 115, the portable computer 100 communicates with attached peripheral devices 155 through the cable dock 130 via the interface cable.

Component Details and Operation

FIGS. 2 through 6 illustrate perspective views of the various components and embodiments of the present invention. Specifically, these figures illustrate the receiving tray, the tray expansion module, and the interface cable with auxiliary connectors.

Computer Receiving Tray

Figure 2A:
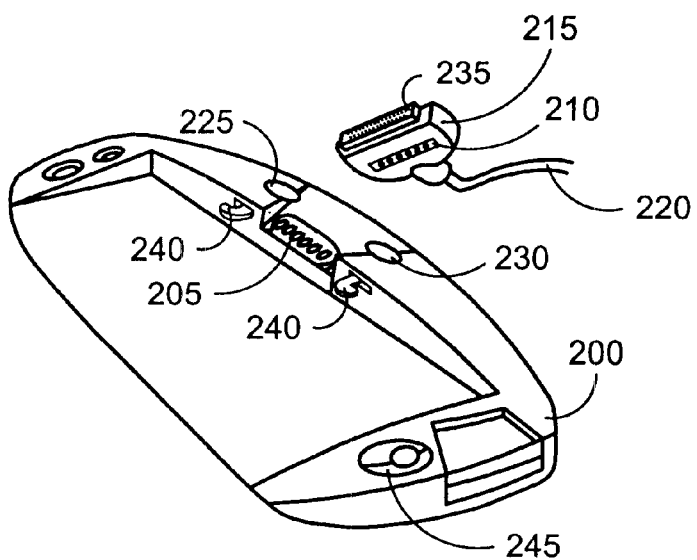
FIG. 2A is a perspective view of a receiving tray in accordance with the present invention.
Figure 2B:
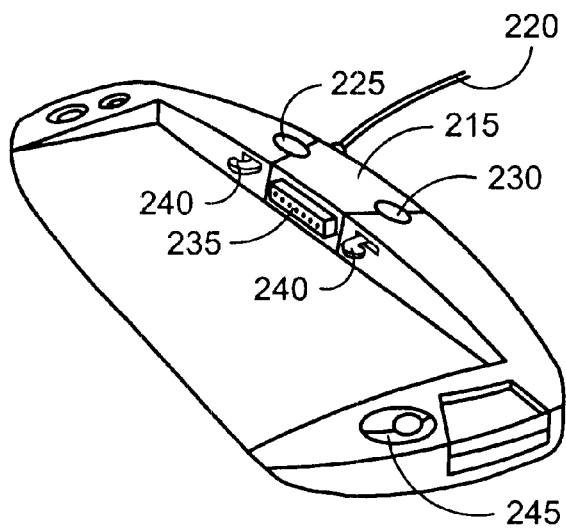
FIG. 2B is a perspective view of the receiving tray of FIG. 2A, shown with an attached interface cable.

FIG. 2A illustrates one embodiment of a receiving tray in accordance with the present invention. Specifically, the receiving tray 200 has an internal electrical connector 205 for establishing an electrical communications interface with an interface socket 210 integrated into the surface of the tray connector 215 of the interface cable 220. In operation, the tray connector 215 is secured to the receiving tray 200 by brackets 225 and 230 as shown in FIG. 2B. A computer connector 235 is coupled to the end of the tray connector 215. The computer connector 235 is placed into position for interfacing with a portable computer by securing the tray connector 215 to the receiving tray 200. Consequently, an electrical interface is established between the portable computer and the interface cable 220 by simply sliding the portable computer into the receiving tray 200, where it connects to the computer connector 235 of the interface cable, which in turn connects to a cable dock.

In this embodiment, the size and shape of the receiving tray 200 and the computer connector 225 are designed to receive a specific type or model of portable computer. Consequently, a different size and shape of receiving tray 200 and interface cable computer connector 235 is preferably used for each different portable computer.

Figure 3:
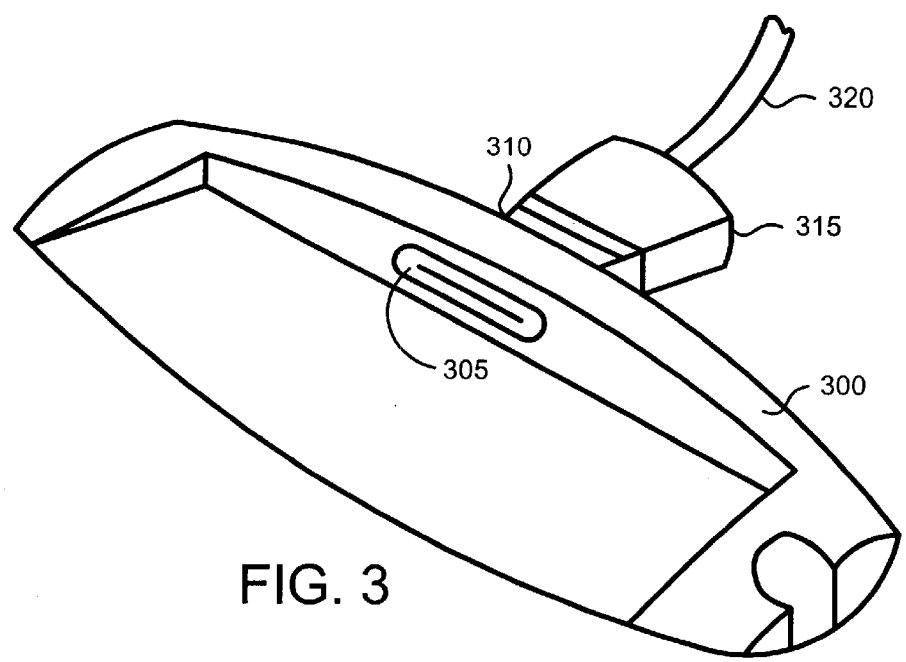
FIG. 3 is a perspective view of an alternate embodiment of a receiving tray in accordance with the present invention.

Alternatively, as illustrated in FIG. 3, a receiving tray 300 may have an integral computer connector 305 for establishing an electrical interface between the receiving tray and the portable computer. In this embodiment, the receiving tray 300 has an external connector 310 for receiving the tray connector 315 of the interface cable 320. Consequently, an electrical interface is established between the portable computer and the interface cable 320 by simply sliding the portable computer into the receiving tray 300, where it connects to the integral computer connector 305, which is in turn electrically connected to the external connector 310 of the receiving tray, which is in turn electrically connected to the tray connector 315 of the interface cable 320. Again, the interface cable 320 is also electrically connected to the cable dock.

In this embodiment, the size and shape of the receiving tray 300 and the integral computer connector 305 are designed to receive a specific type or model of portable computer. Consequently, a different size and shape of receiving tray 300 and integral computer connector 305 is preferably used for each different portable computer. However, in this embodiment, the external connector 310 of the receiving tray 300 is preferably identical for each variation of the receiving tray. Consequently, the same interface cable 320 can be used with a wide range of portable computers by simply providing the appropriate receiving tray 300.

As illustrated in FIGS. 2A and 2B, in each embodiment of the receiving tray 200, the receiving tray has security latches 240 that are designed to receive specific portable computers. The security latches 240 serve either of at least two purposes. First, the security latches 240 prevent a portable computer from being removed from the receiving tray until such time as it is safe to do so, and second, the security latches 240 prevent or deter theft of the portable computer.

Preventing premature removal of the portable computer from the receiving tray 200 is an important issue where peripheral devices are connected to the portable computer through the interface cable 220. While the portable computer is communicating with a peripheral device such as a hard drive, optical drive, or other data storage or input device, termination of the interface while communications are active can result in adverse effects such as corruption of data or damage to sensitive electrical components.

Consequently, a release button or lever 245 is integrated into the surface of the receiving tray 200. When the user desires to remove the portable computer from the receiving tray 200, the user activates the release button or lever 245. Electronics integrated into the tray in conjunction with software installed in the portable computer respond to user activation of the release button or lever 245 to retract the security latches 240. However, the security latches 240 are not retracted until the portable computer can be safely undocked or released from the receiving tray 200 without the risk of data corruption or damage to sensitive electrical components. Further, the user can lock the security latches 240 such that unauthorized removal of the portable computer is prevented. The security features of the receiving tray are substantially similar to those described for the docking system in a commonly assigned and copending patent application entitled HORIZONTAL LOADING DOCKING STATION WITH UNINTERRUPTIBLE POWER SUPPLY, Ser. No. 08/960,736, filed on Oct. 30, 1997, and is incorporated herein by reference.

In an alternate embodiment of the receiving tray, the receiving tray is designed without security latches and the associated control electronics and software as described and referenced above. This embodiment is valuable for use with portable computers that have not been designed to interface with security latches, or where the user does not require or desire the aforementioned security features.

Each of the embodiments of the receiving tray may be secured to the users desk or workspace using conventional security devices such as those used for securing portable computers.

Tray Expansion Module

Figure 4:
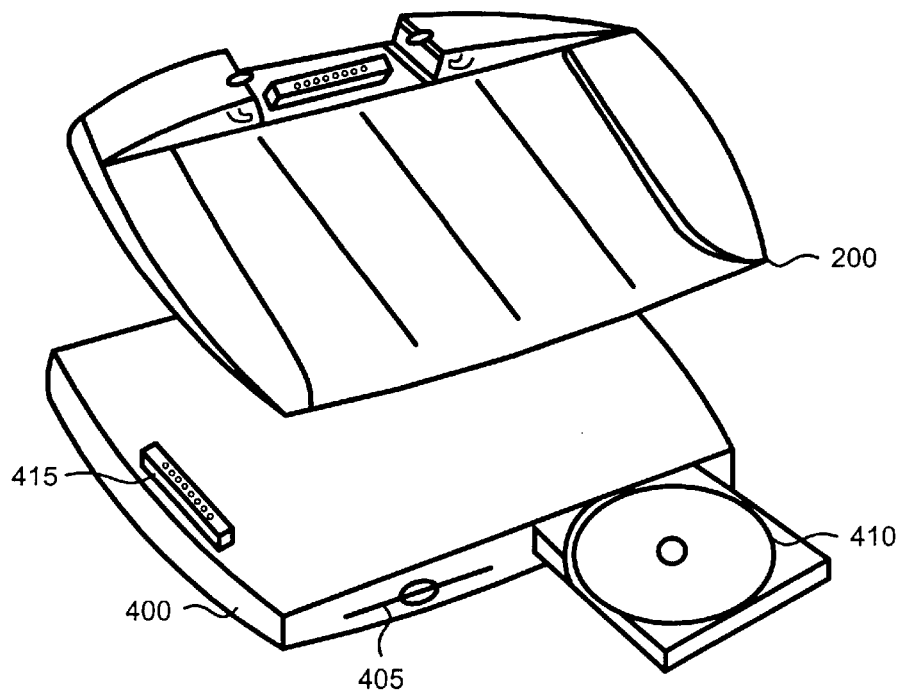
FIG. 4 is a perspective view of the receiving tray of FIG. 2A, showing a detachable tray expansion module in accordance with the present invention.

A user often has the need to access peripheral devices such as, for example, an optical disk drive, floppy drive, or tape drive. Consequently, as illustrated in FIG. 4, a tray expansion module 400 is removably connected to the any of the previously described embodiments of the receiving tray 200/300, but in an alternate embodiment may be integral to the receiving tray. The tray expansion module 400 has at least one expansion bay for the addition of peripheral devices such as, for example, a floppy drive 405, or an optical disk drive 410.

The connection between the receiving tray 200 and the tray expansion module 400 provides both a physical and electrical connection, via an expansion interface 415, that both secures the tray expansion module to the receiving tray, and provides an electrical communications interface between peripheral devices within the tray expansion module and the receiving tray. Peripherals installed within the tray expansion module are controlled by the electronics in the remote cable dock through the interface cable that connects the receiving tray to the cable dock. Alternately, peripherals installed within the tray expansion module are controlled directly by the portable computer.

In a further embodiment of the tray expansion module, the portable computer may connect directly to the tray expansion module, with the tray expansion module in turn connecting to the receiving tray. In this embodiment, the tray expansion module provides security features similar to those described above for the receiving tray to prevent premature removal and deter theft of the portable computer. As described above, the connections between the portable computer, the tray expansion module, and the receiving tray provide electrical connections that provide an electrical communications interface between the portable computer, peripheral devices within the tray expansion module and the receiving tray. Consequently, the portable computer is capable of interfacing with such peripherals either directly, or via the remote cable dock through the interface cable as described above.

Interface Cable

Typically, peripheral devices, such as, for example, scanners, pointing devices, digital cameras, keyboards, microphones, speakers or video displays are located quite near the portable computer so that the user is able to simultaneously interact with both the portable computer and the peripheral devices. Because the cable dock is remote from the portable computer to reduce clutter, it may be impractical or inconvenient to connect such peripherals to the remote cable dock depending upon the on the location and distance of the cable dock. Further, while the portable computer is attached to the receiving tray, it is typically not possible to connect such peripherals directly to the portable computer. In addition, a user often has the need to connect and disconnect peripheral devices to and from the portable computer that do not necessarily need to be collocated with the portable computer. However, it is frequently inconvenient for the user to connect these devices directly to the remote cable dock.

Figure 5:
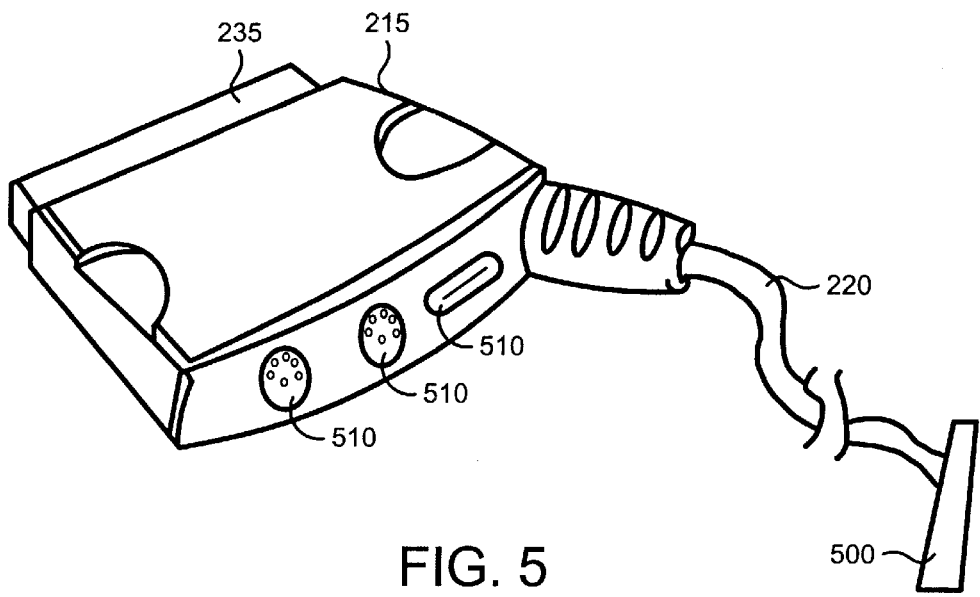
FIG. 5 is a rear perspective view of a tray interface connector in accordance with the present invention.

Consequently, as illustrated in FIG. 5, the interface cable 220 of the present invention has a tray connector 215 on one end for establishing an electrical connection to the receiving tray, and a dock connector 500 on the other end for establishing an electrical connection to the cable dock. Further, the tray connector 215 of the interface cable 220 has at least one auxiliary connector 510 disposed on the outer surface of the tray connector that provide the user with the capability to connect at least one peripheral device such as, for example, scanners, pointing devices, digital cameras, keyboards, microphones, speakers or video displays directly to the tray connector.

Peripheral devices such as, for example, scanners, pointing devices, digital cameras, keyboards, microphones, speakers and video displays are commonly available with PS2, USB, serial, parallel, IEEE 1394, audio input or output, or video input or output connectors. Thus, at least one of these connectors 510 are integrated into the surface of the tray connector 215 for use in connecting peripherals to the portable computer. Therefore, the user can connect peripheral devices, which must be located relatively near the portable computer, directly to the tray connector of the interface cable. As with other peripheral devices connected to the portable computer through the receiving tray, control of the devices is managed remotely by the electronics in the cable dock via the interface cable 220. Alternately, control of the peripheral devices may be managed directly by the portable computer.

Figure 6:
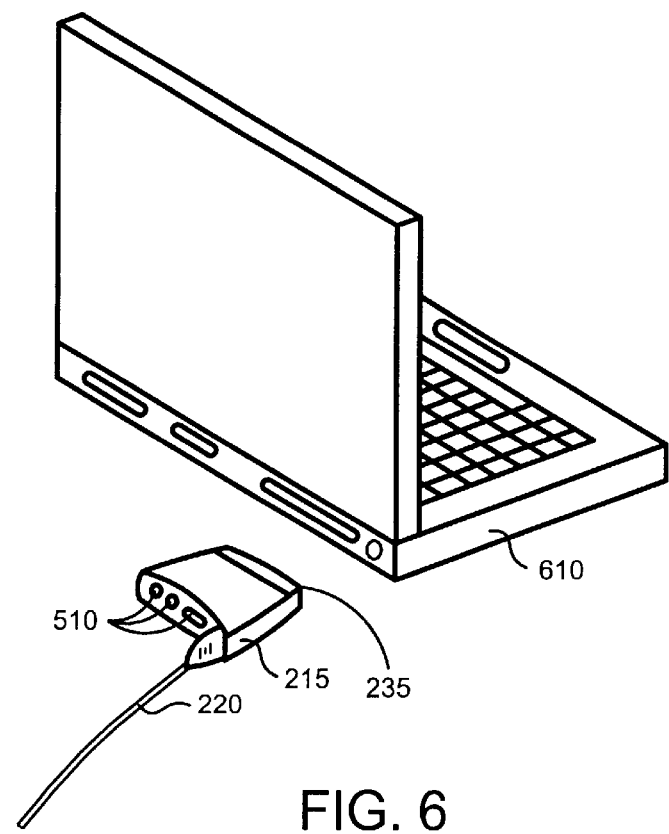
FIG. 6 is a perspective view of a cable dock interface cable for connecting directly to a portable computer in accordance with the present invention.

Alternatively, as illustrated in FIG. 6, the computer connector 235 of the tray connector 215 of the interface cable 220 is secured directly to the portable computer 610 without the need to use a receiving tray. Consequently, an electrical interface is established between the portable computer 610 and the interface cable 220 by simply connecting the portable computer 610 to the computer connector 235, which in turn connects to the cable dock via the interface cable 220. As described above, the tray connector 215 of the interface cable 220 has auxiliary peripheral connectors 510 which may be used to interface peripheral devices to the portable computer 610 through the cable dock via the interface cable 220.

The ability to plug the interface cable 220 directly into the portable computer 610 is advantageous in that the cost of the receiving tray is eliminated where the features of the receiving tray are not required or desired by the user. As described above, a different size and shape of interface cable computer connector 235 is preferably used for each different portable computer 610.

Cable Dock

Referring back to FIG. 1, the cable dock 130 contains the control electronics for interfacing peripheral devices to the portable computer 100 via the interface cable 115. The cable dock 130 communicates with the portable computer 100 via the interface cable 115.

As with the auxiliary connectors 135 of the tray connector 120 of the interface cable 115, and the auxiliary connectors 145 of the receiving tray 105, the cable dock 130 has at least one auxiliary connectors 155, such as, for example, PS2, USB, serial, parallel, IEEE 1394, audio input or output, or video input or output connectors, for allowing the user to attach peripheral devices 160 directly to the cable dock. As with the auxiliary connectors on the tray connector 120 of the interface cable 115, the portable computer 100 communicates with attached peripheral devices 155 through the cable dock 130 via the interface cable. Further details regarding the cable dock are provided in the commonly assigned and copending patent application, entitled CONNECTOR SYSTEM FOR A DOCKING STATION OF A PORTABLE COMPUTER SYSTEM, Ser. No. 09/547,361, filed on Apr. 11, 2000, the same day as the instant application. The subject matter of this copending patent application is incorporated herein by this reference.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the following claims.

What is claimed is:

1. A docking system for receiving a portable computer, comprising:

a tray having a first communications interface coupled to the tray;

an interface cable having a first end connected to the first communications interface;

a remote expansion and upgrade box having a second communications interface connected to a second end of the interface cable, thereby establishing a communications pathway between the tray and the remote expansion and upgrade box via the interface cable; and latches releasably securing the interface cable to the tray.

2. The docking system of claim 1 wherein the tray has a third communications interface that connects to a portable computer to establish a communications pathway between the portable computer and both the tray and the remote expansion and upgrade box via the interface cable.

3. The docking system of claim 1 wherein the interface cable has a fourth communications interface that connects to a portable computer to establish a communications pathway between the portable computer and both the tray and the remote expansion and upgrade box via the interface cable.

4. The docking system of claim 1 wherein the interface cable has at least one auxiliary connector that attaches at least one peripheral device directly to the interface cable.

5. The docking system of claim 4 wherein the at least one peripheral device attached to the interface cable is controlled by the remote expansion and upgrade box via the interface cable.

6. The docking system of claim 1 further comprising a tray expansion module which is connected to the tray via a fifth communications interface that is coupled to the tray expansion module to establish a communications pathway between the tray expansion module, the tray, a portable computer, and the remote expansion and upgrade box via the interface cable.

7. The docking system of claim 6 wherein the tray expansion module has at least one expansion bay for the addition of at least one peripheral device.

8. The docking system of claim 7 wherein the at least one expansion bay has a communications interface that connects each at least one peripheral device to the tray expansion module to establish a communications pathway between the peripheral devices, the tray expansion module, the tray, a portable computer, and the remote expansion and upgrade box via the interface cable.

9. The docking system of claim 1 wherein the tray further comprises at least one auxiliary connector that attaches at least one peripheral device directly to the tray.

10. The docking system of claim 9 wherein peripheral devices that are attached to the tray are controlled by the remote expansion and upgrade box via the interface cable.

11. The docking system of claim 1 further comprising latches releasably securing a portable computer to the tray.

12. An interface system for coupling a portable computer to external devices comprising:

an interface cable removeably coupled between the portable computer and a remote expansion and upgrade box to establish a communications pathway between the portable computer and the remote expansion and upgrade box via the interface cable, and including at least one auxiliary connector that removeably couples the external devices directly to the interface cable.

13. The docking system of claim 12 where the auxiliary connectors comprise at least one PS2 type connector.

14. The docking system of claim 12 where the auxiliary connectors comprise at least one USB type connector.

15. The docking system of claim 12 where the auxiliary connectors comprise at least one IEEE 1394 type connector.

16. A docking system comprising:

a portable computer receiving tray having at least one expansion bay for at least one peripheral device;

an interface cable removeably coupled to the receiving tray that connects the receiving tray to a remote expansion and upgrade box to provide a communications pathway between the tray and the remote expansion and upgrade box; and a first communications interface coupled to a surface of the receiving tray that connects the portable computer to the receiving tray to provide a communications pathway between the portable computer and the remote expansion and upgrade box via the interface cable.

17. The docking system of claim 16, wherein at least one auxiliary connector is coupled to a surface of the receiving tray, and wherein each auxiliary connector provides a communications pathway between peripheral devices and the portable computer via the first communications interface.

18. The docking system of claim 16 wherein at least one auxiliary connector is coupled to a surface of the interface cable, and wherein each auxiliary conector provides a communications pathway between peripheral devices and the portable computer via the first communications interface.

19. The docking system of claim 16 further comprising a tray expansion module which is connected to the receiving tray via a second electrical communications interface that is coupled to the tray expansion module to establish a communications pathway between the tray expansion module, the receiving tray, the portable computer, and the remote expansion and upgrade box via the interface cable.

20. The docking system of claim 19 wherein the tray expansion module has at least one expansion bay for the addition of at least one peripheral device.

* * * * *